(12) United States Patent
Higashi

(10) Patent No.: US 6,522,501 B1
(45) Date of Patent: Feb. 18, 2003

(54) MAGNETIC RECORDING MEDIUM AND MAGNETIC WRITE/READ APPARATUS USING THE SAME

(75) Inventor: Keiko Higashi, Tachikawa (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 226 days.

(21) Appl. No.: 09/661,570

(22) Filed: Sep. 14, 2000

(30) Foreign Application Priority Data

Dec. 28, 1999 (JP) .......................................... 11-375038

(51) Int. Cl.$^7$ .............................. G11B 5/82; G11B 5/60
(52) U.S. Cl. ..................................... 360/135; 360/237.1
(58) Field of Search ............................. 360/135, 235.8, 360/236.6, 237.1

(56) References Cited

U.S. PATENT DOCUMENTS 5,030,494 A * 7/1991 Ahlert et al. .......... 204/192.15
5,441,788 A * 8/1995 Bloomquist et al. ........ 428/141
5,650,237 A * 7/1997 Satoh et al. ................. 428/141
5,673,156 A * 9/1997 Chen et al. ............... 360/236.6

FOREIGN PATENT DOCUMENTS

| EP | 000583985 A2 | * | 2/1994 |
| JP | 6-36277 | | 2/1994 |
| JP | 08077554 A | * | 3/1996 |
| JP | 08235579 A | * | 9/1996 |
| JP | 08293111 A | * | 11/1996 |
| JP | 09180177 A | * | 7/1997 |
| JP | 10134345 A | * | 5/1998 |
| JP | 10188270 A | * | 7/1998 |
| WO | WO 95/06942 | * | 3/1995 |

* cited by examiner

Primary Examiner—William Klimowicz
(74) Attorney, Agent, or Firm—Pillsbury Winthrop LLP

(57) ABSTRACT

A magnetic recording medium is obtained, which satisfies R−9709/N<6.6, when its surface is attracted by a magnetic head with a surface pressure of 250 gf/mm$^2$ or less or has a load area ratio of 5% or less, where N is the number of asperities per $\mu$m square and R (nm) is an average of radii of curvature at peaks of the asperities. This magnetic recording medium does not cause dynamic attraction even if the head contact slides with it, and rotates stably, so that information can stably be written/read well.

4 Claims, 2 Drawing Sheets

MAGNETIC RECORDING MEDIUM AND MAGNETIC WRITE/READ APPARATUS USING THE SAME

CROSS-REFERENCE TO RELATED APPLICATIONS

This application is based upon and claims the benefit of priority from the prior Japanese Patent Application No. 11-375038, Dec. 28, 1999, the entire contents of which are incorporated herein by reference.

BACKGROUND OF THE INVENTION

The present invention relates to a magnetic write/read apparatus for magnetically writing/reading information and a magnetic recording medium used in the same and, more particularly, to a head load/unload scheme magnetic write/read apparatus having a contact type head slider mounted on it with a head which comes into contact with the surface of a magnetic recording medium in the write/read mode and which is retreated outside the magnetic recording medium in the non-read/write mode, and a magnetic recording medium used in the same.

As a means for improving the recording density of a magnetic write/read apparatus, the spacing between the head and disk may be decreased. In recent years, transition of the magnetic write/read apparatus from one with a flying type head, with which a write/read is performed while keeping the head to fly from a rotating magnetic disk, to one with a contact type head, with which the head is brought into continuous contact with a rotating magnetic disk, has been studied in order to further decrease the spacing between the head and disk.

With the former apparatus, an error occurs in the flying height depending on the individual difference and variations in attaching the head, and the like. A spacing is accordingly formed between the head and disk by an amount corresponding to the head flying height and its error. This spacing can be decreased only limitedly. With the latter apparatus, the spacing between the head and disk can be decreased as it can be as small as an amount corresponding to the roughness of the head and disk. Nevertheless, the latter scheme has not been realized due to the problems of the wear and dynamic stiction of the head.

An example of the head operating scheme of the magnetic write/read apparatus includes the CSS scheme and the load/unload scheme. With the CSS scheme, when the head is not in the write/read mode, it has been landed on the inner circumference of the stationary disk. In order to increase the recording density of the magnetic write/read apparatus, the spacing between the head and disk must be decreased, and the surface roughness of the head and disk must be decreased for this purpose. When, however, objects with a small surface roughness come into contact with each other, because of the lubricant and water vapor on the disk which exist between the head and disk, a force for attracting the head and disk to each other is generated to cause stiction. In the CSS scheme, the head is landed on the stationary disk, causing static stiction. Due to this static stiction, an excessive force acts on the head during starting. Then, the starting operation of the head may become unstable, and the spindle motor may become unable to operate.

In order to solve these problems, the load/unload scheme may be raised. With the load/unload scheme, when the head is not in the write/read mode, that is, when the disk does not rotate, the head has been retreated from above the disk onto a ramp outside the disk, and does not land on the stationary disk. Thus, when the load/unload scheme is used, static stiction does not occur. In a magnetic write/read apparatus using a flying type head, the disk and head come into continuous contact with each other only in the non-write/read mode. Thus, static stiction is avoided by employing the load/unload scheme. In the magnetic write/read apparatus using a contact type head, however, the head comes into continuous contact with the rotating disk in the write/read mode, thus causing dynamic stiction. When this dynamic stiction occurs, variations in stiction force of the traveling head excite vibration of the head, causing the head to jump.

A technique aiming at prevention of static stiction between a disk and head, which uses both the CSS scheme and the flying scheme, has conventionally been studied. For example, according to one method, in order to decrease the head flying height, the surface roughness of the disk is decreased on the data zone, while its CSS zone has an artificial texture, thereby preventing static stiction. According to another method, in order to decrease the landing area of the head, an stiction preventive pad is formed on the air bearing pad. These methods aim at avoiding static stiction occurring when the head is landed on a stationary disk. With the structure as described above, the surface roughness of the disk is increased, or that of the head is increased. However, from the viewpoint of prevention of dynamic stiction in the write/read mode of a contact recording type head, these methods cannot be employed because they increase the spacing undesirably. If disks have the same surface shape, the static stiction force is larger than a dynamic stiction force. Hence, even among disks having such a large static stiction force that they cannot be used with the prior art, some do have a dynamic stiction force only at an acceptable level. In addition, this dynamic stiction occurs while the disk rotates. Therefore, this stiction state cannot be specified easily.

BRIEF SUMMARY OF THE INVENTION

It is the first object of the present invention to provide a magnetic recording medium which does not cause dynamic stiction even if a head contact slides with it, and accordingly can be written and read well.

It is the second object of the present invention to provide a magnetic write/read apparatus the head of which does not cause a jumping phenomenon due to dynamic stiction even if it comes into slidable contact with a magnetic recording medium, and accordingly can write/read well.

First, the present invention provides a magnetic recording medium, comprising, a magnetic layer on which information is readed by a magnetic head, a protective layer formed on the magnetic layer, wherein the protective layer having a surface with which a magnetic head comes into contact to generate a static stiction force on the surface, the static stiction force is not more than 250 $gf/mm^2$.

Second, the present invention provides a magnetic recording medium, comprising, a magnetic layer on which information is readed by a magnetic head, a protective layer formed on the magnetic layer;

wherein the protective layer having a plurality of asperities on a surface and satisfying R−9709/N<6.6, when a load area ratio is not more than 5%, where N is the number of asperities per $\mu m$ square and R (nm) is an average of currature radius of peaks of the asperities.

Third, the present invention provides a magnetic write/read apparatus comprising a magnetic recording medium according to the first or second invention, and driving means for supporting and rotationally driving the magnetic recording medium, a head slider mounted with a head to write/read information on/from the magnetic recording medium;

a ramp member for causing the head slider to escape from above a surface of the magnetic recording medium and holding the head slider, and head actuator means for supporting the head slider, loading the head slider from the ramp member to above the surface of the magnetic recording medium, and unloading the head slider from above the surface of the magnetic recording medium to the ramp member.

According to the present invention, a magnetic recording medium can be obtained, which does not cause dynamic stiction even if a head comes into slidable contact with it, and accordingly can be written and read well.

According to the present invention, a magnetic write/read apparatus can be obtained, the head of which does not cause a jumping phenomenon due to dynamic stiction even if it contact slides with a magnetic recording medium, and accordingly can write/read well.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
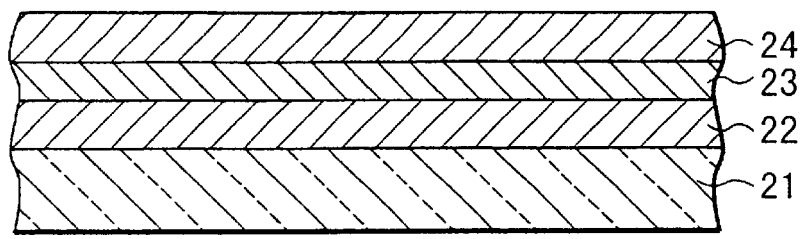
FIG. 1 is a view showing an arrangement of a magnetic recording medium according to the present invention.

The present invention relates to a load/unload scheme magnetic write/read apparatus mounted with a contact type head slider and a magnetic recording medium used in the same.

The present invention is roughly divided into inventions concerning the following four aspects.

The invention according to the first aspect provides a magnetic recording medium suitably used in a magnetic write/read apparatus comprising, a magnetic layer on which information is readed by a magnetic head, a protective layer formed on the magnetic layer, wherein the protective layer having a surface with which a magnetic head comes into contact to generate a static stiction force on the surface, the static stiction force is not more than 250 $gf/mm^2$.

The invention according to the second aspect provides a magnetic recording medium, comprising, a magnetic layer on which information is readed by a magnetic head, a protective layer formed on the magnetic layer;

wherein the protective layer having a plurality of asperities on a surface and satisfying R−9709/N<6.6, when a load area ratio is not more than 5%, where N is the number of asperities per $\mu$m square and R (nm) is an average of currature radius of peaks of the asperities.

The invention according to the third aspect provides a magnetic write/read apparatus using the magnetic recording medium according to the first invention.

This magnetic write/read apparatus comprises a magnetic recording medium having a surface to which a pressure is generated by a static stiction of 250 $gf/mm^2$ or less, a driving means for supporting and rotationally driving the magnetic recording medium, a head slider mounted with a head to write/read information on/from the magnetic recording medium, a ramp member for causing the head slider to escape from above a surface of the magnetic recording medium and holding the head slider, and a head actuator means for supporting the head slider, loading the head slider from the ramp member to above the surface of the magnetic recording medium, and unloading the head slider from above the surface of the magnetic recording medium to the ramp member, respectively.

The invention according to the fourth aspect provides a magnetic write/read apparatus using the magnetic recording medium according to the invention of the second aspect.

This magnetic write/read apparatus comprises a magnetic recording medium having a plurality of asperities on a surface thereof and satisfying R−9709/N<6.6, when a load area ratio is 5% or less, where N is the number of asperities per $\mu$m square and R (nm) is an average of radii of curvature at peaks of the asperities, a driving means for supporting and rotationally driving the magnetic recording medium, a head slider mounted with a head to write/read information on/from the magnetic recording medium, a ramp member for causing the head slider to escape from above a surface of the magnetic recording medium and holding the head slider, and a head actuator means for supporting the head slider, loading the head slider from the ramp member to above the surface of the magnetic recording medium, and unloading the head slider from above the surface of the magnetic recording medium to the ramp member.

The magnetic recording medium described above preferably has a maximum asperity height of 5 nm or less from its average surface. The average surface refers to a surface obtained by the primary method of least squares.

The present invention will be described in detail with reference to the accompanying drawings.

FIG. 1 shows an arrangement of the magnetic recording medium according to the present invention.

As shown in FIG. 1, this magnetic recording medium is obtained by forming a cobalt chromium magnetic layer 22 by, e.g., sputtering, on a glass substrate 21, a carbon protective layer 23 by, e.g., sputtering or CVD, and a fonbrin lubricating layer 24 by, e.g., dipping. A plurality of asperities are formed on the surface of the magnetic recording medium by, e.g., adjusting the polishing conditions of a glass substrate to be used. In this case, R−9709/N<6.6 is satisfied, when the load area ratio is 5% or less, where N is the number of asperities per μm square and R (nm) is the average of the radii of curvature of the peaks of the asperities. The magnetic head attracts the surface of this magnetic recording medium with a surface pressure of 250 gf/mm$^2$ or less. The maximum asperity height is 5 nm or less from the average surface of the magnetic recording medium.

Figure 2:
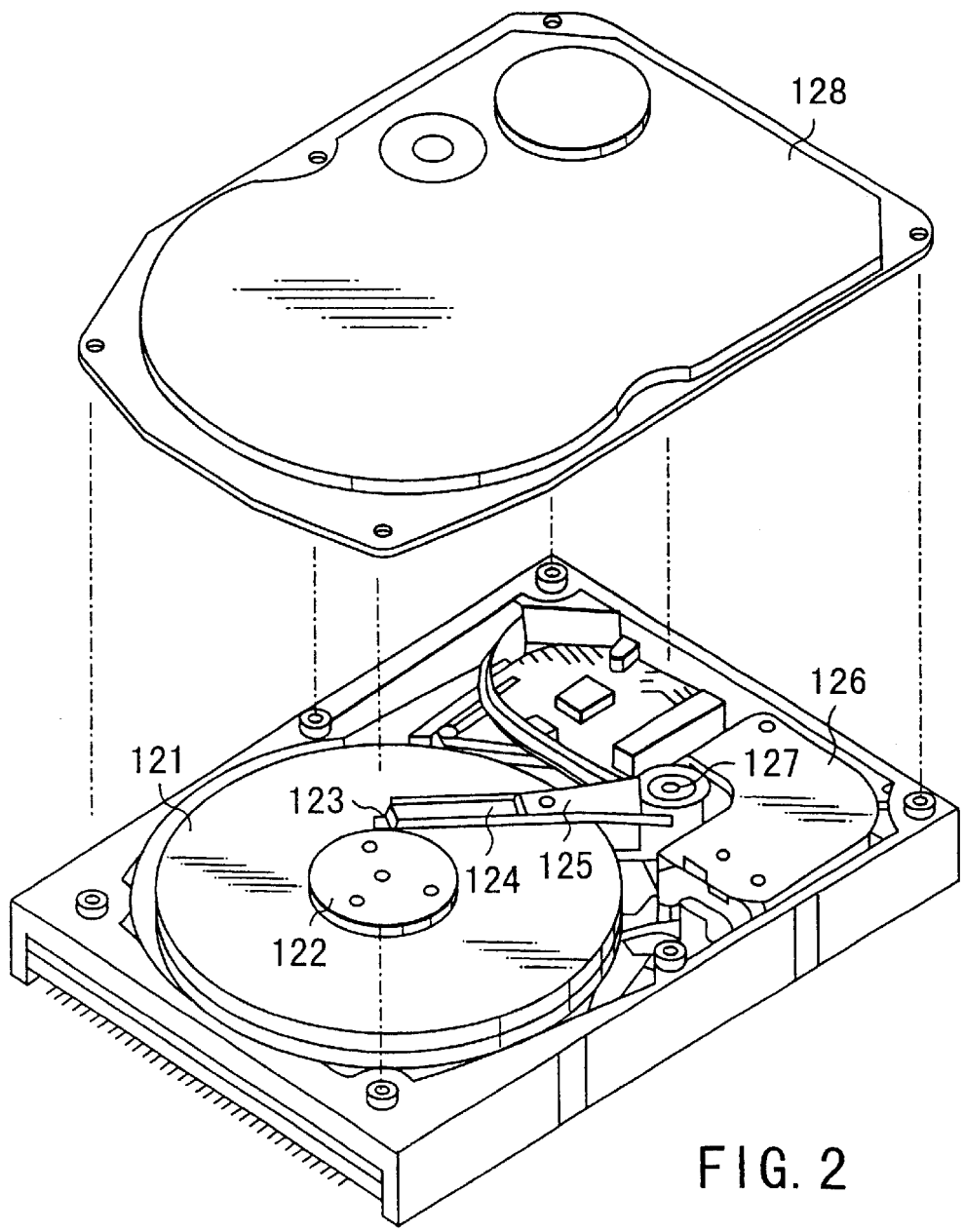
FIG. 2 is a partly exploded perspective view showing an example of a magnetic write/read apparatus according to the present invention.

FIG. 2 is a partly exploded perspective view showing an example of the magnetic write/read apparatus according to the present invention.

A magnetic disk 121 with a rigid structure to record information is mounted on a spindle 122, and is driven by a spindle motor (not shown) to rotate at a predetermined speed. A slider 123 mounted with a magnetic head to access the magnetic disk 121 and to write/read information is attached to the distal end of a suspension 124 comprised of a thin leaf spring. The suspension 124 is connected to one end side of an arm 125 having a bobbin or the like for holding a driving coil (not shown). The slider 123 is a contact type slider which comes into contact with the magnetic disk to magnetically write/read information on/from it, and is urged by the suspension 124 against the magnetic disk 121 with a predetermined force P.

A voice coil motor 126 as a kind of linear motor is provided to the other end side of the arm 125. The voice coil motor 126 is comprised of a driving coil (not shown) wound on the bobbin of the arm 125, and a magnetic circuit constituted by a permanent magnet and opposite yoke arranged to oppose each other to sandwich the driving coil.

The arm 125 is held by ball bearings (not shown) provided to the upper and lower portions of a stationary shaft 127, and is driven by the voice coil motor 126 to rotate and swing. In other words, the position of the slider 123 above the magnetic disk 121 is controlled by the voice coil motor 126. In FIG. 2, reference numeral 128 denotes a lid.

In order to realize contact recording by using a contact type head slider as in the present invention, to suppress the wear amount and dynamic stiction of the head is significant.

In contact recording, in order to suppress the wear amount of the head, a write/read is performed with a low load, unlike with a flying head. If the contact area between the head and magnetic recording medium is large, dynamic stiction occurs. This dynamic stiction changes the head stiction force. Consequently, a phenomenon in which the head vibrates to travel unstably and a phenomenon in which a force acts to the head in the radial direction to interfere with tracking are observed to occur.

In contact recording, the spacing between the head and magnetic recording medium is determined by the surface roughness of the head and that of the magnetic recording medium. The contact area between the head and magnetic recording medium is very small as compared to the total area of the magnetic recording medium. Thus, it is assumed that, when the head is caused to contact slide with the magnetic recording medium, the surface shape of the magnetic recording medium may change over time. For this reason, the shape of the contact area of the head is difficult to control.

The stiction phenomenon occurring between the magnetic head and the surface of the magnetic recording medium is a phenomenon in which a lubricant and water vapor are present in the interface between the head and magnetic recording medium to form a meniscus, thus generating forces in such directions that the head and magnetic recording medium attract each other.

Figure 3:
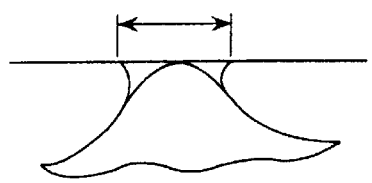
FIG. 3 is a schematic view showing an example of the meniscus shape and the curvature radius of a peak of asperity.
Figure 4:
FIG. 4 is a schematic view showing another example of the meniscus shape and the curvature radius of a peak of aspen.

FIGS. 3 and 4 are schematic views showing the shape of the meniscus and the curvature radius of the asperity. FIG. 3 shows a case wherein the diameter of the meniscus is small, and FIG. 4 shows a case wherein the diameter of the meniscus is large.

While rotational driving of the magnetic recording medium is stopped, a sufficiently long time can be assured to form a meniscus on the magnetic recording medium. In contrast to this, when the magnetic recording medium is rotationally driven, a time required for forming a meniscus becomes short on the magnetic recording medium. Then, dynamic stiction generated until saturation is smaller than the static stiction force and is difficult to measure. Even on a region of a magnetic recording medium with a large static stiction force, it is sufficiently probable that the dynamic stiction force does not become large to pose a problem.

The inventions according to the first and third aspects are defined by obtaining the relationship between dynamic stiction occurring between the surface of the head of a contact type head slider and the surface of the magnetic recording medium, and the surface pressure of attraction representing the static stiction force produced at this time.

In the inventions according to the second and fourth aspects, the static frictional force of a magnetic recording medium that causes dynamic stiction and that of a magnetic recording medium that does not cause dynamic stiction are calculated, and the topographies of these magnetic recording media are defined.

Two types of magnetic recording media, i.e., a disk A with the maximum asperity height of approximately 10 nm and a disk B with the maximum asperity height of 4 nm or less, were prepared. The contact head was caused to contact slide with each disk, and vibration of each disk was observed.

Regarding the disk A, the contact head contact slides it well, while the disk B vibrates by dynamic stiction. The difference between the actually employed disks A and B resides in the shapes of the asperities on their surfaces.

Figure 5:
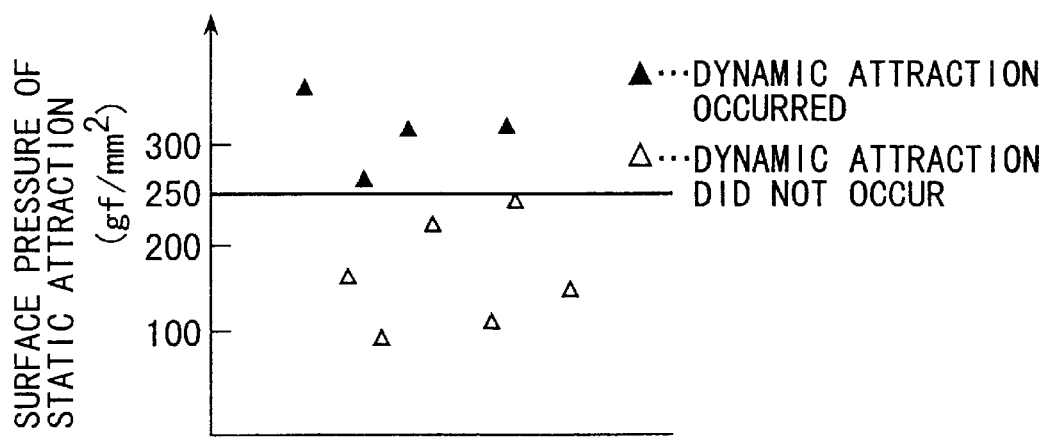
FIG. 5 is a graph showing the relationship between the surface pressure of static stiction and occurrence of dynamic stiction.

Similarly, a plurality if disks with different topographies were prepared, and the surface pressures of their static stiction were calculated in the following manner. FIG. 5 shows a graph showing the relationship between the surface pressure of static stiction and occurrence of dynamic stiction.

The shapes of the surface asperities of the disks used in the experiment were measured by AFM (Atomic Force Microscopy). After that, the load area ratio of 5% at the peaks of the asperities, which may substantially contribute to stiction, was analyzed, and the shapes and number of the asperities were obtained.

Asperities with a load area ratio of 5% are asperities with heights which correspond to 5% of the entire area from peaks of the asperities. With the number and shapes of these asperities, the surface pressure of static stiction was analyzed.

From FIG. 5, it is apparent that asperities which cause static stiction with a surface pressure of 250 gf/$\mu$m$^2$ or less do not produce dynamic stiction, and that dynamic stiction occurs when the surface pressure of static stiction exceeds 250 gf/$\mu$m$^2$.

Note that in a disk which did not cause dynamic stiction during this experiment, the maximum asperity height from the average surface was nearly 10 nm. When contact recording was realized by using this disk, the effective gap between the head and disk increased undesirably, and the contact type head lost its advantage over a flying type head.

10 nm of a maximum peak of asperities on the surface of a disk for a contact type is not enough to increase a recording density of the disk for a contact type more than a recording density of a disk for a fling type. It means that a preffered maximum peak of asperities on the surface of the disk for a contact type is not more than 5 nm.

Figure 6:
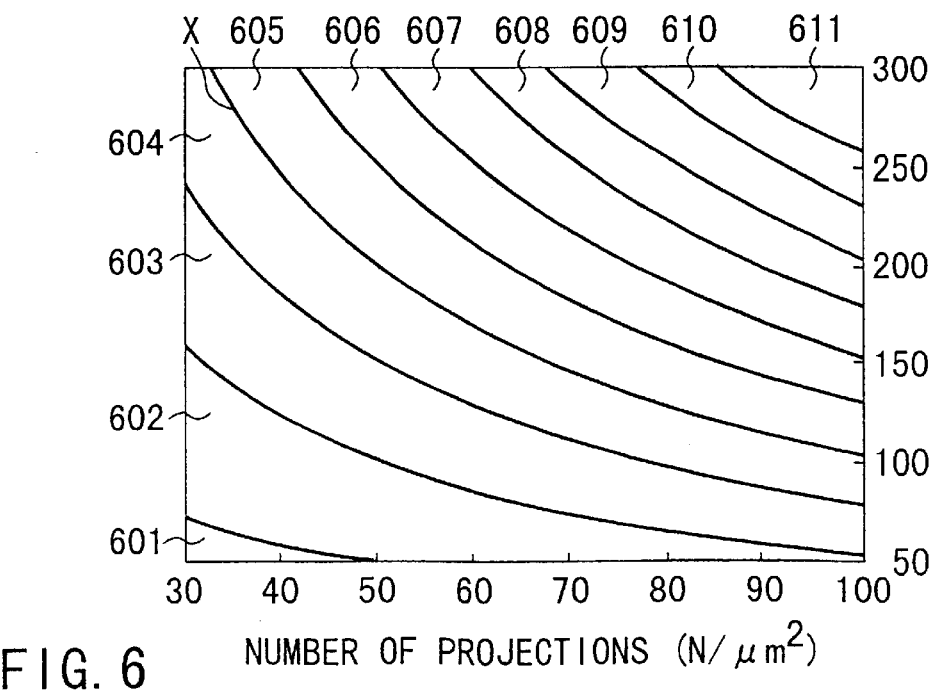
FIG. 6 is a graph showing a static stiction force obtained when the number of asperities and the curvature of the peaks of each asperity are changed.

The disk according to the present invention has topographies that implement a disk having a small surface roughness with the same stiction force as that of a disk which does not cause dynamic stiction. FIG. 6 shows results obtained by calculating the surface pressure of static stiction while changing the number of asperities and the shapes of the curves at the peaks of the asperities in a disk with the maximum height of 5 nm from the average surface.

In FIG. 6, regions 601 to 611 respectively denote regions with an attraction surface pressure of
50 gf/$\mu$m$^2$ or more and less than 100 gf/$\mu$m$^2$,
100 gf/$\mu$m$^2$ or more and less than 150 gf/$\mu$m$^2$,
150 gf/$\mu$m$^2$ or more and less than 200 gf/$\mu$m$^2$,
200 gf/$\mu$m$^2$ or more and less than 250 gf/$\mu$m$^2$,
250 gf/$\mu$m$^2$ or more and less than 300 gf/$\mu$m$^2$
300 gf/$\mu$m$^2$ or more and less than 350 gf/$\mu$m$^2$
350 gf/$\mu$m$^2$ or more and less than 400 gf/$\mu$m$^2$,
400 gf/$\mu$m$^2$ or more and less than 450 gf/$\mu$m$^2$,
450 gf/$\mu$m$^2$ or more and less than 500 gf/$\mu$m$^2$
500 gf/$\mu$m$^2$ or more and less than 550 gf/$\mu$m$^2$, and
550 gf/$\mu$m$^2$ or more and less than 600 gf/$\mu$m$^2$.

In FIG. 6, regions with curves at their peaks with stiction surface pressures higher than that of a curve X are unsatisfactory regions, and regions with curves at their peaks with stiction surface pressures lower than that of the curve X are satisfactory regions. As a result, the relation between the number of asperities and the curves at the peaks of the asperities of a disk that does not cause dynamic stiction can be led. The shape of a asperity on the surface of a disk that does not cause a dynamic stiction phenomenon satisfies, when a load area is 5% or less, $$R-9709/N>6.6$$

where N is the number of asperities per $\mu$m square and R is the curvature radius of the peaks of the asperities.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium, comprising:

a magnetic layer on which information is readed by a magnetic head;

a protective layer formed on said magnetic layer;

wherein said protective layer has a plurality of asperities on a surface and satisfying R−9709/N<6.6, when a load area ratio is not more than 5%, where N is the number of asperities per $\mu$m square and R (nm) is an average of curvature radius of peaks of said asperities.

2. A medium according to claim 1, wherein said asperities of a maximum asperity height from an average surface thereof is not more than 5 nm.

3. A magnetic write/read apparatus, comprising:

a magnetic recording medium having a plurality of asperities on a surface thereof and satisfying R−9709/N<6.6, when a load area ratio is not more than 5%, where N is the number of asperities per $\mu$m square and R (nm) is an average of curvature radius of peaks of said asperities;

driving means for supporting and rotationally driving said magnetic recording medium;

a head slider mounted with a head to write/read information on/from said magnetic recording medium;

a ramp member for causing said head slider to escape from above a surface of said magnetic recording medium and holding said head slider; and head actuator means for supporting said head slider, loading said head slider from said ramp member to above said surface of said magnetic recording medium, and unloading said head slider from above said surface of said magnetic recording medium to said ramp member.

4. An apparatus according to claim 3, wherein said magnetic recording medium has a plurality of asperities on said surface, said asperities of a maximum asperity height from an average surface thereof is not more than 5 nm.

* * * * *